US012755306B2

(12) United States Patent
Huraifi et al.

(10) Patent No.: US 12,755,306 B2
(45) Date of Patent: Oct. 6, 2026

(54) UTILIZING BLOCKCHAIN TECHNOLOGY TO AUTOMATE SERVICE INVOICE PROCESSING

(71) Applicant: SAUDI ARABIAN OIL COMPANY, Dhahran (SA)

(72) Inventors: Ali A. Huraifi, Qatif (SA); Abdullah M. Askari, Tarut (SA); Mohammed A. Aboulsamh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 544 days.

(21) Appl. No.: 18/060,837

(22) Filed: Dec. 1, 2022

(65) Prior Publication Data

US 2024/0185316 A1 Jun. 6, 2024

(51) Int. Cl.
*G06Q 30/00* (2023.01)
*G06Q 30/04* (2012.01)
*G06Q 30/0601* (2023.01)

(52) U.S. Cl.
CPC ......... *G06Q 30/0603* (2013.01); *G06Q 30/04* (2013.01)

(58) Field of Classification Search
CPC ........................... G06Q 30/0603; G06Q 30/04
USPC ........................................................... 705/28
See application file for complete search history.

(56) References Cited

U.S. PATENT DOCUMENTS 10,963,854 B2 3/2021 Jin et al.
11,049,115 B2 6/2021 Yang et al.
11,087,371 B2 8/2021 Feng et al.
11,126,739 B2 9/2021 Xiao et al.
2019/0012637 A1* 1/2019 Gillen ................ G06Q 10/0833
2022/0092516 A1* 3/2022 Hunter ............. G06Q 10/06393
2024/0144141 A1* 5/2024 Cella .................. G06Q 30/0202

* cited by examiner

*Primary Examiner* — Rokib Masud
(74) *Attorney, Agent, or Firm* — Vorys, Sater, Seymour and Pease LLP

(57) ABSTRACT

Various embodiments described herein are related to blockchain-based solutions to certifying the status of contracted services via one or more smart contracts. For example, one or more embodiments regard a method that comprises defining a service catalog based on a service contract between a plurality of entities. The service catalog includes a service line item and an associated delivery of service parameter. Further, the service catalog is recorded on a blockchain. The method can also include executing a service delivery smart contract to determine a delivery status of the service line item by comparing the delivery of service parameter to a delivery detail recorded on the blockchain or a lack of the delivery detail on the blockchain.

5 Claims, 7 Drawing Sheets

UTILIZING BLOCKCHAIN TECHNOLOGY TO AUTOMATE SERVICE INVOICE PROCESSING

FIELD OF THE DISCLOSURE

The present disclosure relates generally to the use of blockchain technology to verify vendor service invoices and, more particularly, to systems and/or computer-implemented methods that employ blockchain platforms to unify the mode of operation between an enterprise and its vendors to facilitate the verification of vendor service invoices.

BACKGROUND OF THE DISCLOSURE

While the verification of the delivery of materials is readily performed by examining the physical goods, the verification of delivered services, and associated invoices, can be challenging due to the intangible nature of many aspects of the procured services. Verifying service delivery typically requires significant time and cost to ensure compliance with terms and conditions of service contracts, the intended scope of the service, and/or corporate standards. Consequently, processing vender service invoices can be a length process, prone to disputes and/or improper cash flow management. In the oil and gas industry, example services can be engineering services to design production facilities; oil field services to enable upstream exploration activities; and plant maintenance services to ensure reliability of assets.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method is provided. The method can comprise defining a service catalog based on a service contract between a plurality of entities. The service catalog can include a service line item and an associated delivery of service parameter. Also the service catalog can be recorded on a blockchain. The method can also comprise executing a service delivery smart contract to determine a delivery status of the service line item by comparing the delivery of service parameter to a delivery detail recorded on the blockchain or a lack of the delivery detail on the blockchain.

In another embodiment, a system is provided. The system can comprise a memory to store computer executable instructions. The system can also comprise one or more processors, operatively coupled to the memory, that can execute the computer executable instructions to implement a service cataloger configured to define a service catalog based on a service contract between a plurality of entities. The service catalog can include a service line item and an associated delivery of service parameter. Also, the service catalog is recorded on a blockchain. The one or more processors can also execute the computer executable instructions to implement a service delivery smart contract configured to determine a delivery status of the service line item by comparing the delivery of service parameter to a delivery detail recorded on the blockchain or a lack of the delivery detail on the blockchain.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
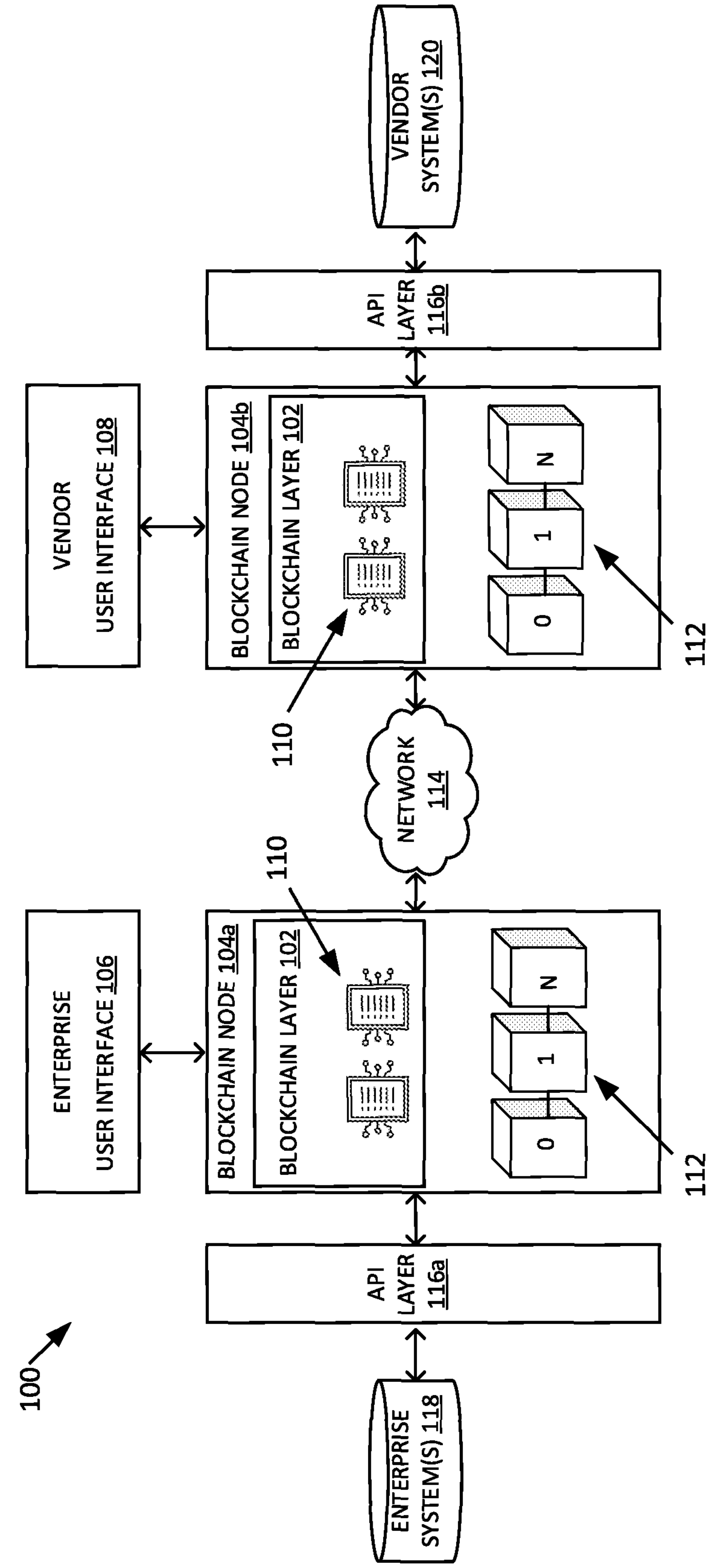
FIG. 1 is a diagram of a non-limiting example system that can utilize blockchain technology to verify and manage service invoices in accordance with one or more embodiments described herein.

Embodiments of the present disclosure will now be described in detail with reference to the accompanying figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The delivery of services by a contractor and/or supplier is typically characterized by an invoice. However, managing service agreements via invoice tracking can face a plethora of challenges. For example, the parties to a service agreement often operate independently, asynchronously, and/or with limited visibility regarding the actions and/or perspectives of the other side. This lack of transparency can be a cause for disagreement, miscommunication, and/or disputes. As a result, confirming service delivery, submitting invoices, verifying service details in relation to established contractual terms, and/or reconciling payments for tendered services can be a time and resource consuming process. For example, as each party has its own system of records that are not synchronized, it is common for an invoice to have misinformation (e.g., due to data entry errors related to service line items, payment date, amount owed, and/or related purchase order). A costly and time-consuming process typically follows for correction and reconciliation, leading to disputes and corrective actions. The lengthy processing time of supplier invoices can also lead to cash flow forecast issues and impact both parties' investment capabilities.

Embodiments in accordance with the present disclosure generally relate to computer-implemented methods and/or systems that utilize a blockchain-based solution that unifies the mode of operation between an enterprise and its service vendors to facilitate the verification of vendor service invoices. The various embodiments described herein can enable an enterprise and its vendors to work with a distributed ledger of records to increase transparency and real-time transaction settlement.

In various embodiments, the blockchain-based solution can comprise: service cataloging; service request operations; service delivery and certification; and/or service invoicing. For example, computerized analysis templates can be utilized to define a service catalog based on existing corporate service contracts between an enterprise and its external vendors and/or suppliers. Next, one or more contract service line items from the contract service catalog can be used to initiate a service request, which can take the form of a digital user interface that defines the scope of a requested service in reference to, for example, a purchase order. Upon completing fulfillment of a requested service, delivery certification (e.g., in the form of a blockchain smart contract) can be utilized to compare service delivery details with delivery completion specifications associated with each service line item defined in the service request. Additionally, the one or more vendors can utilize the blockchain platform to generate an invoicing package that includes supporting documents for the accepted services, which can be used to bill the enterprise for services certified by the smart contract.

Moreover, various embodiments described herein can constitute one or more technical improvements over conventional invoice verification methods by employing blockchain technology that can enable an enterprise and its vendors to participate in a business network and work with a single system of records (e.g., a distributed ledger) to provide transparency between the parties and real-time transaction settlement. For instance, verifying service invoices via a blockchain platform enables an enterprise and its vendors to have a single mode of operation, where each party can look into a shared and distributed system of records; thereby rendering transaction clearing and settling operations to be performed near instantaneously to increase transparency and payment accuracy while eliminating reconciliation, dispute, and fraud. Further, various embodiments described herein can generate smart contracts based on contractual terms and agreements defining one or more vendor services, and utilize the smart contracts to automatically verify fulfillment of requested services based on observations of the service provided. Additionally, one or more embodiments described herein can have a practical application by utilizing the decentralization and cryptography offered by blockchain technology to adhere to high levels of privacy and security controls regarding business and/or transactional data. Since the blockchain data is immutable, the participating parties can have increased confidence in the data without requiring manual checks to ensure data compliance and/or authenticity.

FIG. 1 illustrates a non-limiting example system 100 that can comprise multiple components deployed at enterprise and vendor domains. For example, the system 100 includes one or more blockchain layers 102 distributed amongst a plurality of blockchain nodes 104 (e.g., networked computers), which can be managed and/or operated by the enterprise and/or the one or more vendors in accordance with one or more embodiments described herein. As shown in FIG. 1, a first blockchain node 104*a* can communicate with one or more enterprise user interfaces 106, which can be employed to enable one or more users associated with the enterprise entity to interact with the one or more blockchain layers 102. Likewise, one or more second blockchain nodes 104*b* can communicate with one or more vendor user interfaces 108, which can be employed to enable one or more users associated with the vendors contracted by the enterprise to interact with the one or more blockchain layers 102. For example, the enterprise user interface 106 can be employed to generate one or more service requests, and the vendor user interface 108 can be employed to input delivery details and/or supporting documents regarding service delivery in accordance with various embodiments described herein. The enterprise user interface 106 and/or the vendor user interface 108 can be embodied via mobile devices, web pages, service-specific computer equipment, a combination thereof, and/or the like.

The blockchain layer 102 can provide one or more service delivery smart contracts 110 and/or blockchains 112, which can be shared amongst the blockchain nodes 104 via one or more networks 114. In various embodiments described herein, the service delivery smart contracts 110 and/or blockchains 112 can ensure shared verification controls, common data review, and/or alter-proof records of service delivery and invoicing across the blockchain nodes 104. As described further below, the service delivery smart contracts 110 are encoded to identify delivery of service ("DoS") parameters associated with a requested service and determine a delivery status for the requested service based on whether the DoS parameters have been satisfied. The DoS parameters can be defined by one or more contractual terms and/or conditions between the enterprise and its vendors that are captured within one or more digital service catalogs. Further, the service delivery smart contracts 110 can determine whether delivery of a service request has been accepted, partially accepted, or not accepted based on the number of satisfied DoS parameters. Moreover, various embodiments described herein can generate one or more invoices and/or notifications based on the autonomous determinations of the one or more service delivery smart contracts 110.

In various embodiments, the blockchain 112 is a distributed ledger that stores data in the forms of blocks correlated in sequential order to form a chain. For instance, FIG. 1 depicts an exemplary representation of the blockchain 112 as a blockchain comprising a number of blocks (e.g., block 0, block 1, and block N). A block is the primary data structure in a blockchain 112 defined by the blockchain layer 102, where each block describes a linked group of data records. For example, each block can represent a procured service together with its associated transaction data for a service record that can occur between multiple parties of the system 100 and may include reference to other blocks (e.g., comprising historic data) in the blockchain 112 that it represents.

For instance, the blocks can store data entered into the system 100 via the enterprise user interface 106 and/or the vendor user interface 108 along with transaction data facilitated by the blockchain layer 102. In various embodiments, each block can represent a procured service and/or details of the procured service including, but not limited to: digital records of contract terms and/or services, data characterizing and/or defining one or more service delivery smart contracts 110, digital delivery claims characterizing one or more service deliveries, payment records, vender details, contract details, service line item details, service completion specifications, service delivery certifications, a combination thereof, and/or the like. Within each block, stored data can be hashed to enhance data security. For example, each block subsequent to the first block can contain a hash of a previous block and a time stamp representing the time at which the block was created.

The one or more networks 114 can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks 114 can include, but are not limited to: wireless fidelity ("Wi-Fi"), a WiMAX network, a wireless LAN ("WLAN") network, BLUETOOTH® technology, a combination thereof, and/or the like. For instance, the one or more networks 114 can include the Internet and/or the IoT. In various embodiments, the one or more networks 114 can comprise one or more transmission lines (e.g., copper, optical, or wireless transmission lines), routers, gateway computers, and/or servers. Further, the one or more blockchain nodes 104 can comprise one or more network adapters and/or interfaces (not shown) to facilitate communications via the one or more networks 114.

As shown in FIG. 1, the system 100 can further comprise one or more application programming interfaces ("APIs") 116 that can be configured define interface points between the blockchain layer 102 (e.g., in particular one or more smart contracts 110) and existing enterprise systems 118 and/or vendor systems 120. For instance, a first API **116*a* can define an interface between the blockchain layer 102 and the enterprise systems 118, while a second API 116*b* can define an interface between the blockchain layer 102 and the vendor systems 120. The integration with the existing enterprise systems 118 and/or vendor systems 120 can be enabled by one or more events emitted by the blockchain layer 102, which can be generated based on pre-configured conditions representing system actions. The emitted events can be fed to the one or more APIs 116 to trigger pre-specified tasks to be actioned by the enterprise systems 118 and/or vendor systems 120. For example, where a vendor submits a record (e.g., a support document regarding delivery of a contracted service) to the blockchain layer 102 (e.g., via the vendor user interface 108), a first API 116*a* can trigger a workflow in the enterprise systems 118 that routes a copy of the record to a user associated with the enterprise for review. Once the record is approved, the existing enterprise systems 118 can trigger the first API 116*a* to update the blockchain layer 102 with a status characterizing the submitted record. In another instance, in the case of delivery approval by the enterprise, the second API 116*b* can be triggered in regards to the vendor systems 120 to initiate the generation of a related invoicing package. In the case of delivery rejection by the enterprise, the second API 116*b*** can be triggered to enable the vendor to re-submit a request to certify the delivered service.

Figure 2:
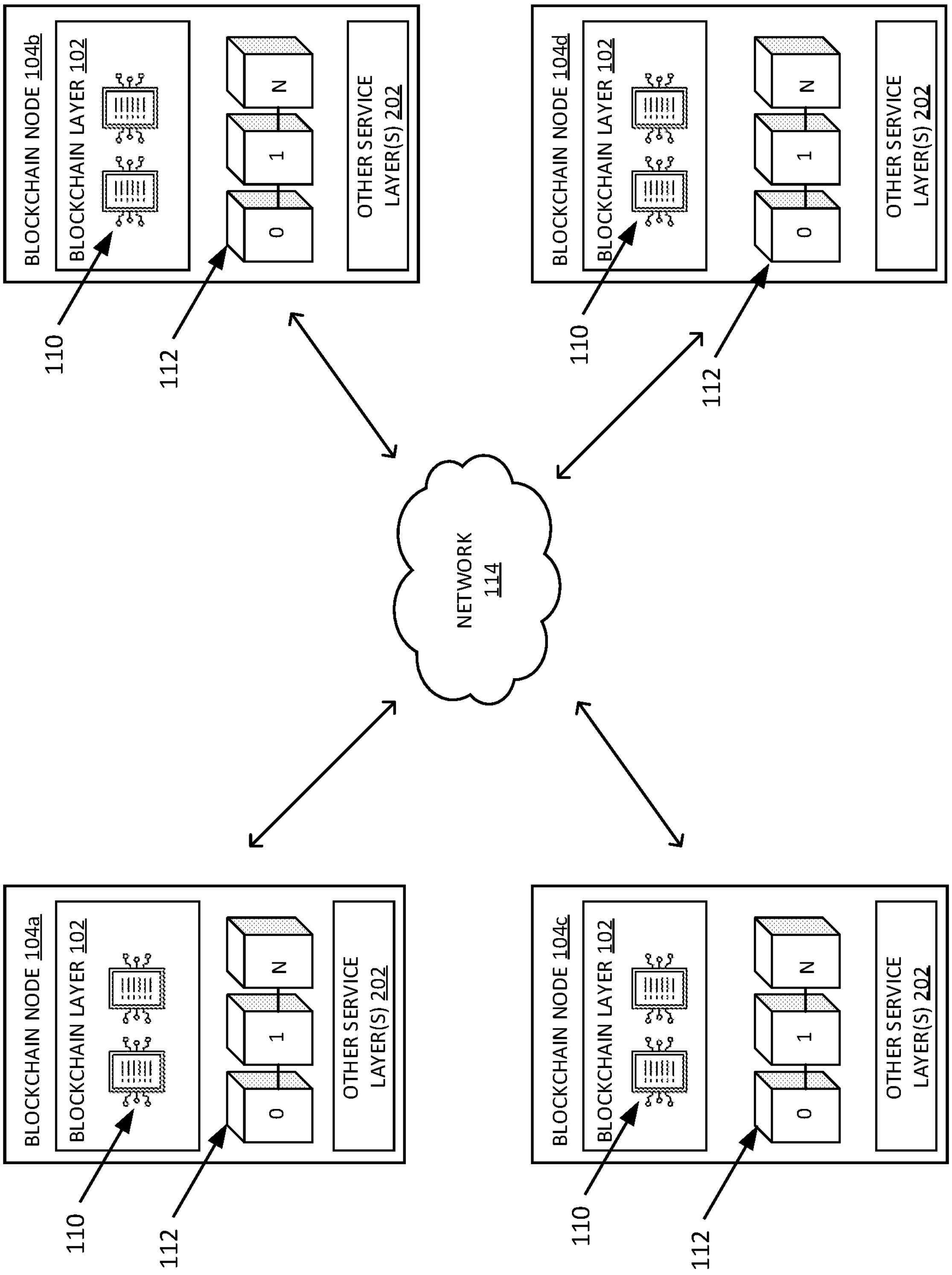
FIG. 2 is a diagram of the non-limiting example system comprising a plurality of blockchain nodes to manage a distributed ledger utilized by one or more smart contracts to verify and manage service invoices in accordance with one or more embodiments described herein.

FIG. 2 illustrates another diagram of the example non-limiting system 100 comprising a plurality of decentralized blockchain nodes 104 in accordance with one or more embodiments described herein. As shown in FIG. 2, the system 100 can comprise multiple blockchain nodes 104 in communication with each other via the one or more networks 114. In various embodiments, respective blockchain nodes 104 can be maintained and/or operated by respective entities utilizing the system 100. For example, a first blockchain node **104*a* can be associated with an enterprise entity; a second blockchain node 104*b* can be associated with a first vendor contracted by the enterprise entity; a third blockchain node 104*c* can be associated with a second vendor contracted by the enterprise entity; and/or a fourth blockchain node 104*d* can be associated with a third vendor contracted by the enterprise entity. In various embodiments, the enterprise and/or a single vendor can be associated with multiple blockchain nodes 104. Further, while four example blockchain nodes 104 are depicted in FIG. 2, embodiments comprising fewer or more blockchain nodes 104** are also envisaged.

As shown in FIG. 2, each blockchain node 104 can store and/or manage a respective copy of the blockchain 112, where each copy can be updated as a block and added to the blockchain 112. Additionally, each blockchain node 104 can execute a similar version of the one or more service delivery smart contracts 110 executed on the blockchain layer 102. In various embodiments, the various blockchain nodes 104 can communicate with each other over the one or more networks 114 to gain agreement on the contents of the blockchain 112 without a central authority coordinating and validating transactions. For instance, the system 100 can require consensus between the blockchain nodes 104 on the validity of a proposed transaction before a block can be created and the blockchain 112 updated. In various embodiments, the system 100 can utilize a selective consensus based on a byzantine fault tolerance mechanism to validate transaction data.

Respective entities utilizing the system 100 can send transaction requests (e.g., via one or more enterprise user interfaces 106 and/or vendor user interfaces 108), in accordance with various embodiments described further below, to the blockchain layer 102 to perform operations defined in one or more service delivery smart contracts 110 stored in the blockchain 112. Once a transaction request is completed, a record of the transaction is added to the blockchain 112 (e.g., stored within one or more additional blocks to the blockchain), after which the recorded transaction cannot be altered or removed. Thereby, the blockchain 112 can be embodied as an immutable block chain of stored data transactions.

In accordance with various embodiments described herein, the blockchain layer 102 can be provided by each blockchain node 104 to execute services necessary for transaction execution based on the blockchain 112, where such services can include the one or more service delivery smart contracts 110. For example, the blockchain layer 102 can include one or more computer programs to execute the service cataloging, service request generation, service delivery certification, and/or service invoicing features described further herein. In one or more embodiments, the blockchain nodes 104 can also provide one or more other service layers 202, such as membership services and/or cryptography services. For example, membership services can manage identity, privacy, confidentiality, and/or auditability across the network 114 of blockchain nodes 104. For instance, membership services can be executed on permissioned blockchains 112, where specific actors are allowed to submit and/or validate transactions. In another example, cryptography services can provide integrity for messages between blockchain nodes 104 and/or ensure operations of the blockchain layer 102 are directed by authorized entities; thereby safeguarding the blockchain 112 from alterations other than the addition of new block of transaction data.

Figure 3:
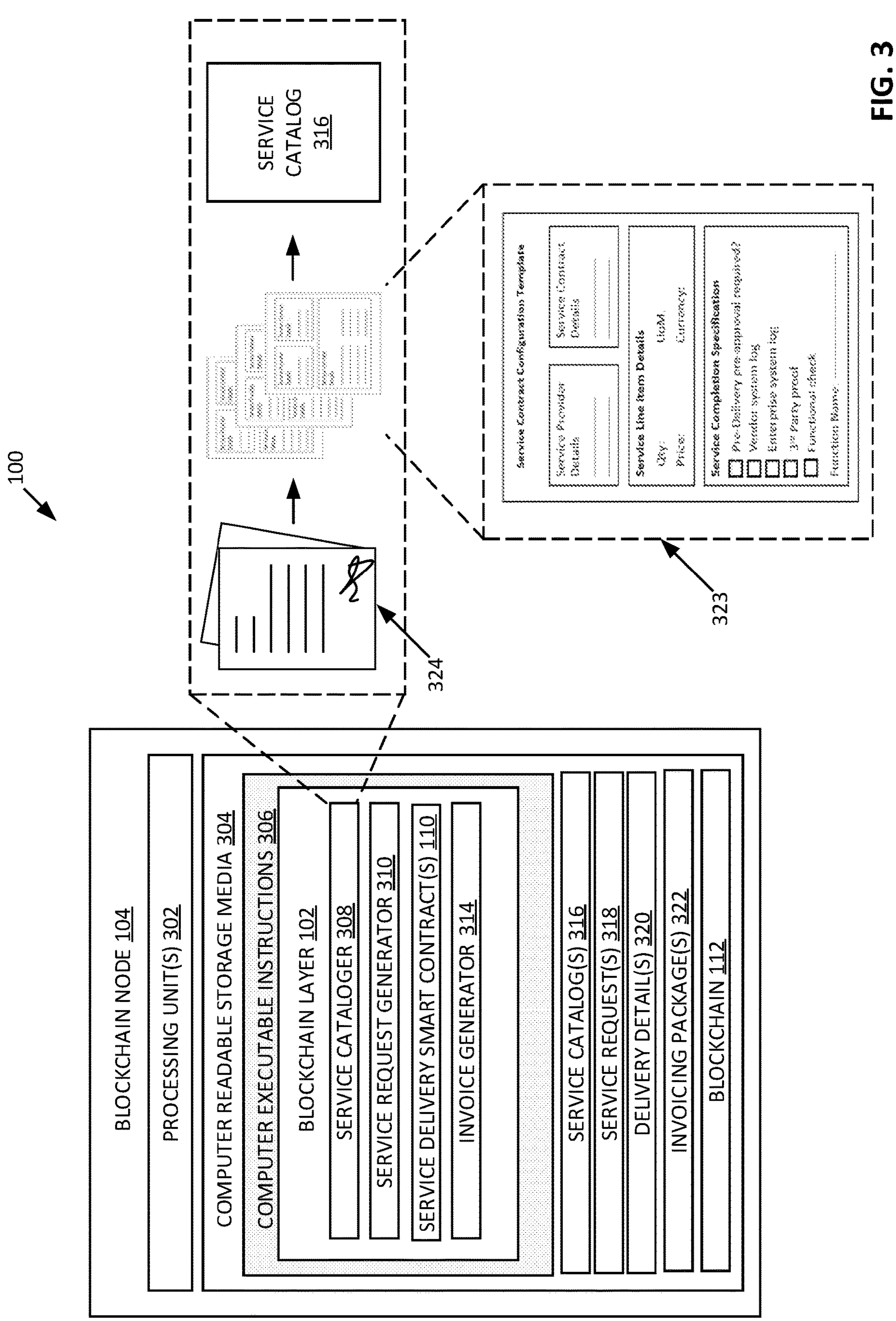
FIG. 3 is a diagram of the non-limiting example system comprising one or more blockchain components that can digitally catalogue vendor services in accordance with one or more embodiments described herein.

FIG. 3 illustrates a diagram of an example, non-limiting blockchain node 104 that can be utilized by the system 100 to validate service invoices in accordance with one or more embodiments described herein. In various embodiments, the blockchain nodes 104 can be, for example, a server, a desktop computer, a laptop, a hand-held computer, a programmable apparatus, a minicomputer, a mainframe computer, an Internet of things ("IoT") device, and/or the like. As shown in FIG. 3, the blockchain nodes 104 can comprise one or more processing units 302 and/or computer readable storage media 304.

In various embodiments, the computer readable storage media 304 can store one or more computer executable instructions 306 that can be executed by the one or more processing units 302 to perform one or more defined functions. In various embodiments, one or more components of the blockchain layer 102, such as a service cataloger 308, a service request generator 310, the service delivery smart contracts 110, and/or an invoice generator 314 can be computer executable instructions 306 and/or can be hardware components operably coupled to the one or more processing units 302. For instance, in some embodiments, the one or more processing units 302 can execute the service request generator 310, service delivery certifier 312, service delivery smart contracts 110, and/or invoice generator 314 to perform various functions described herein. Additionally, the computer readable storage media 306 can store a copy of the blockchain 112, service catalogs 316, service requests 318, delivery details 320, and/or invoicing packages 322.

The one or more processing units 302 can comprise any commercially available processor. For example, the one or more processing units 302 can be a general purpose processor, an application-specific system processor ("ASSIP"), an application-specific instruction set processor ("ASIPs"), or a multiprocessor. For instance, the one or more processing units 302 can comprise a microcontroller, microprocessor, a central processing unit, and/or an embedded processor. In one or more embodiments, the one or more processing units 302 can include electronic circuitry, such as: programmable logic circuitry, field-programmable gate arrays ("FPGA"), programmable logic arrays ("PLA"), an integrated circuit ("IC"), and/or the like.

The one or more computer readable storage media 304 can include, but are not limited to: an electronic storage device, a magnetic storage device, an optical storage device, an electromagnetic storage device, a semiconductor storage device, a combination thereof, and/or the like. For example, the one or more computer readable storage media 304 can comprise: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media 304 can employ transitory or non-transitory signals. In one or more embodiments, the computer readable storage media 304 can be tangible and/or non-transitory. In various embodiments, the one or more computer readable storage media 304 can store the one or more computer executable instructions 306 and/or one or more other software applications, such as: a basic input/output system ("BIOS"), an operating system, program modules, executable packages of software, and/or the like.

The one or more computer executable instructions 306 can be program instructions for carrying out one or more operations described herein. For example, the one or more computer executable instructions 306 can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the one or more computer executable instructions 306 can be written in one or more procedural programming languages. Although FIG. 3 depicts the computer executable instructions 214 stored on computer readable storage media 304, the architecture of the system 100 is not so limited. For example, the one or more computer executable instructions 306 can be embedded in the one or more processing units 302.

In various embodiments, the service cataloger 308 can utilize one or more analysis templates 323 to define one or more digital service catalogs 316 based on one or more contracts 324 between the enterprise and one or more vendors. For example, the service catalog 316 can be based on one or more paper contracts 324 executed by the enterprise and a contracted vendor. In various embodiments, the service cataloger 308 can capture terms and/or conditions defined within a contract 324 via one or more analysis templates 323 to generate the one or more service catalogs 316.

For example, the contract 324 can define, via agreed upon terms and conditions, one or more services to be provided to the enterprise by the one or more vendors. For instance, the contract 324 can define one or more service line items, service scope, delivery conditions, payment terms and conditions, a combination thereof, and/or the like. In one or more embodiments, the contract 324 can be inputted into the system 100 via the enterprise user interface 106 and/or the vendor user interface 108. Additionally, the one or more contracts 324 can be stored within the computer readable storage media 304 of one or more blockchain nodes 104 and/or within the blockchain 112.

The one or more analysis templates 323 can be standardized templates in the form of a user interface (e.g., via the one or more enterprise user interfaces 106 and/or vendor user interfaces 108), which can be populated with terms and/or conditions from the one or more contracts 324 to capture, for example: vendor details, service contract details, service line item details, a combination thereof, and/or the like. Example vender details can include, but are not limited to: a vendor identification number (e.g., a registration number), vendor product catalog details (e.g., a catalog of goods and/or services that can be rendered by the vendor), vendor payment details (e.g., banking details and/or payment schedules), a value added tax number, a combination thereof, and/or the like. Example service contract details can include, but are not limited to: validity dates, proponent organization identifiers, associated purchase orders, contract value, contract signatory from each party, a combination thereof, and/or the like. Example service line item details can include, but are not limited to: quantities of goods, units of measure, performance metrics, DoS parameters, financial account assignment (e.g., general ledger account number), service delivery site and/or location, a combination thereof, and/or the like.

FIG. 3 depicts an example analysis template 323 that can be employed by the service cataloger 308 to generate the one or more service catalogs 316. In one or more embodiments, the service cataloger 308 can present the analysis template 323 to one or more users associated with the enterprise or vendors via the enterprise user interface 106 and/or the vendor user interface 108. In various embodiments, terms and/or conditions defined in the one or more contracts 324 can be categorized into a first category or a second category. The first category can include general clauses relevant to contract payments, service rates, volume discounts, penalties, dispute resolution and/or government regulation, and/or the like. The second category can include technical specifications related to service line item delivery completion. Thereby, the service cataloger 308 can utilize the one or more analysis templates 323 to collect information from the one or more contracts 324 (e.g., via one or more users, such as system administrators) to create a structured data set.

Additionally, the example analysis template 323 depicted in FIG. 3 demonstrates that the service cataloger 308 can utilize the one or more analysis templates 323 to define DoS parameters to be satisfied to verify accepted delivery of service line items. For example, the DoS parameters for each service line item (e.g., sourced from the one or more contracts 324) can be characterized by a matrix of artifacts that regarding delivery of one or more services by the vendors. Example artifacts can include, but are not limited to: vendor reports (e.g., provided by the one or more service providers), written documents, system logs, third party evidence and supporting documents, labor timesheets, a combination thereof, and/or the like.

In various embodiments, the fulfillment of service delivery can also be defined via compliance terms specific to respective service line items. Moreover, the delivery of one defined service line item can relate to one or more other service line items in the service catalog 316 generated by the service cataloger 308 (e.g., DoS parameters associated with a first service line item can be defined based on one or more other service line items used as a threshold value or triggering event). Additionally, in one or more embodiments, the service cataloger 308 can encode one or more rule-based checks into the one or more analysis templates 323 to define validation rules related to the service line items being captured. For example, a validation rule may indicate that labor overtime can only be claimed by a vendor if a threshold amount of non-overtime labor has occurred. Thereby, the one or more validation rules can define one or more constraints and/or conditions on the service line items captured by the analysis templates 323.

Further, the service cataloger 308 can then consolidate the data captured via the standardized analysis templates 323 to generate the one or more service catalogs 316. In various embodiments, the one or more service catalogs 316 can be formatted as one or more charts, tables, spreadsheets, and/or the like. For instance, the service cataloger 308 can consolidate captured contract data into standardized categories, such as: vendor identification numbers, vendor names, service contract numbers, service contract titles, service contract start dates, service contract end dates, service line item identification numbers, service line item descriptions, quantities, units of measurement, price, currency, and/or the like. In one or more embodiments, the data categories defined and/or categorized in the one or more service catalogs 316 can be integrated from the enterprise systems 118 (e.g., from a service procurement program application utilized by the enterprise entity). The service cataloger 308 can integrate data from the one or more standardized analysis templates 323 and/or from the one or more enterprise systems 118 and/or vendor systems 120. For instance, the service cataloger 308 can integrate data defining the vendor identification number, vendor name, service contract number, service contract title, service contract start date, and/or service contract end date from a service procurement application utilized by the enterprise systems 118. Further, the service cataloger 308 can integrate data defining the service line item identification number, service line item description, quantity, unit of measurement, price, and/or currency from the one or more completed analysis templates 323.

In one or more embodiments, DoS parameters associated with one or more service line items can be captured via the analysis templates 323 and included in the service catalogs 316. In accordance with various embodiments described herein, the DoS parameters can define one or more delivery conditions to be satisfied before delivery of a service can be considered accepted (e.g., before a service is considered fulfilled). The DoS parameters can be sourced from the terms and conditions of the contracts 324, and/or can be defined via one or more default settings established via one or more enterprise or vendor users. For example, the DoS parameters can include a completion date and/or timeline associated with one or more respective service line items. In another example, the DoS parameters can include a minimum quantity of goods associated with a respective service line item. In a further example, the DoS parameters can delineate one or more support documents (e.g., characterizing the means of delivery and/or quality of the respective service) that must be submitted to accept delivery. In a still further example, the DoS parameters can define one or more quality metrics and/or quality thresholds that must be satisfied before delivery of the service can be accepted. In various embodiments, the DoS parameters can vary based on the services procured. For instance, DoS parameters can include tracked labor hours and/or data logs (e.g., were drilling services are procured, the DoS parameters can include a log of drilled quantities).

In various embodiments, the service cataloger 308 can generate the one or more service catalogs 316, and/or update one or more existing service catalogs 316, each time a contract 324 is established between the enterprise and a vendor. For example, recognition and/or identification of a new contact 324 by the enterprise systems 118 can trigger the service cataloger 308 to query (e.g., via the enterprise user interface 106) one or more agents of the enterprise to populate an analysis template 323. Thereby, the one or more service catalogs 316 can serve to digitalize existing contracts 324 by translating payment terms and/or contractual conditions into system 100 artifacts that can be referenced to certify delivered services and/or generate invoicing packages 322 in accordance with one or more embodiments described further below.

Figure 4:
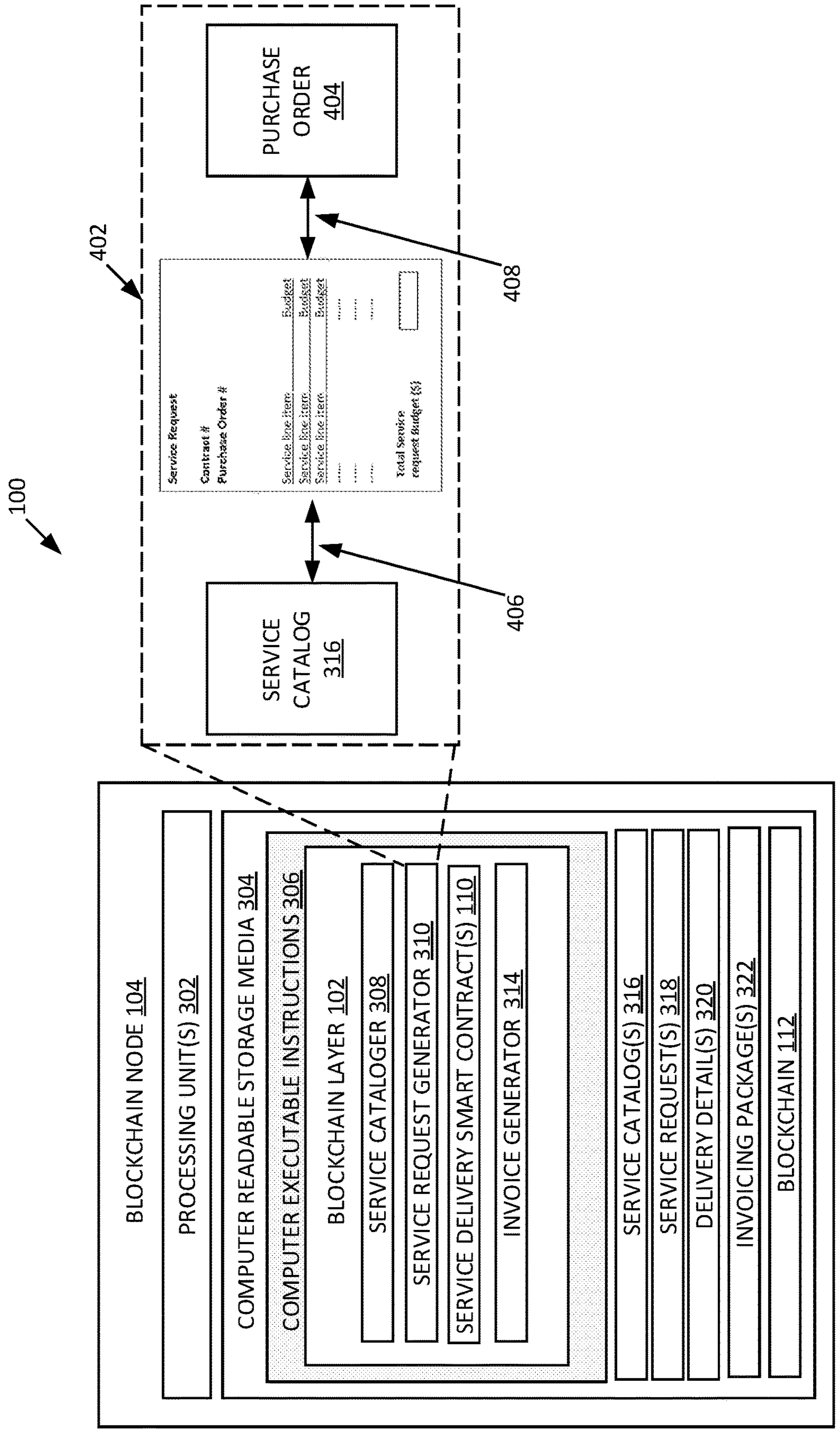
FIG. 4 is a diagram of the non-limiting example service request that can be automatically generated based on the digital catalog services items to manage vendor services via one or more smart contracts in accordance with one or more embodiments described herein.

Further, the service request generator 310 can generate one or more service requests 318 to commission one or more cataloged services from the vendors. For instance, FIG. 4 illustrates a diagram of the example non-limiting service request generator 310 executing one or more service request generation algorithms 402 in accordance with one or more embodiments described herein. Once the one or more service catalogs 316 have been generated, one or more users can employ the service request generator 310 (e.g., via the enterprise user interface 106) to generate one or more service requests 318 that can be shared with one or more vendors (e.g., via the one or more vendor interfaces 108) to initiate a contacted service.

In various embodiments, the one or more generated service requests 318 can define the scope of a requested service by specifying service line items and corresponding budget allocations for the service. For example, the service requests 318 can define one or more contract service line items and/or associated details, such as: service line item codes associated with the requested service, quantities requested, budget allocations, purchase orders, service delivery location, service specifications, expected delivery dates, related safety and work permit procedures, a combination thereof, and/or the like. Further, the one or more service requests 318 can refer to one or more approved purchase orders 404 issued to a contracted vendor. The purchase order 404 can serve as a foundation for a more detailed service request 318 created to specify the services required from the vendor at a granular level (e.g., the service request 318 can further delineate service line items, quantities, and/or rates associated with the service outlined in the purchase order 404). Additionally, the service requests 318 can maintain service delivery specifications associated with the specified service line items by defining service provider and/or third party supporting documents, logs, and/or compliance standards that the service provider is required to comply with for the delivered service to be accepted for payment. For instance, one or more delivery specifications can be sourced from, and/or validated against, the one or more service catalogs 316.

In one or more embodiments, the one or more purchase orders 404 can be provided by the enterprise systems 118. For example, the one or more purchase orders 404 can be sourced from an enterprise resource planning ("ERP") program executed on the enterprise systems 118. At 406 of the service request generation algorithm 402, the service request generator 310 can validate the service line items included in the service request 318 with the service line items defined in the one or more service catalogs 316. For example, the service line items included in the service request 318 can be limited to those defined in the service catalog 316. For instance, an enterprise agent can select one or more service line items from the service catalog 316 for inclusion in the service request 318. At 408 of the service request generation algorithm 402, the service request generator 310 can validate the budget allocation included in the service request 318 with the budget allocation defined in the approved purchase order 404. For example, the service request generator 310 can compare the budget allocation included in the service request 318 with the budget allocation defined in the approved purchase order 404. Where the budget allocations are not equal, the service request generator 310 can prompt (e.g., via the enterprise user interface 106) an enterprise agent to modify the budget associated with one or more service line items in the service request 318 and/or one or more other properties defined in the service request 318 (e.g., such as quantity) to achieve equivalent budget allocations between the service request 318 and purchase order 404.

Figure 5:
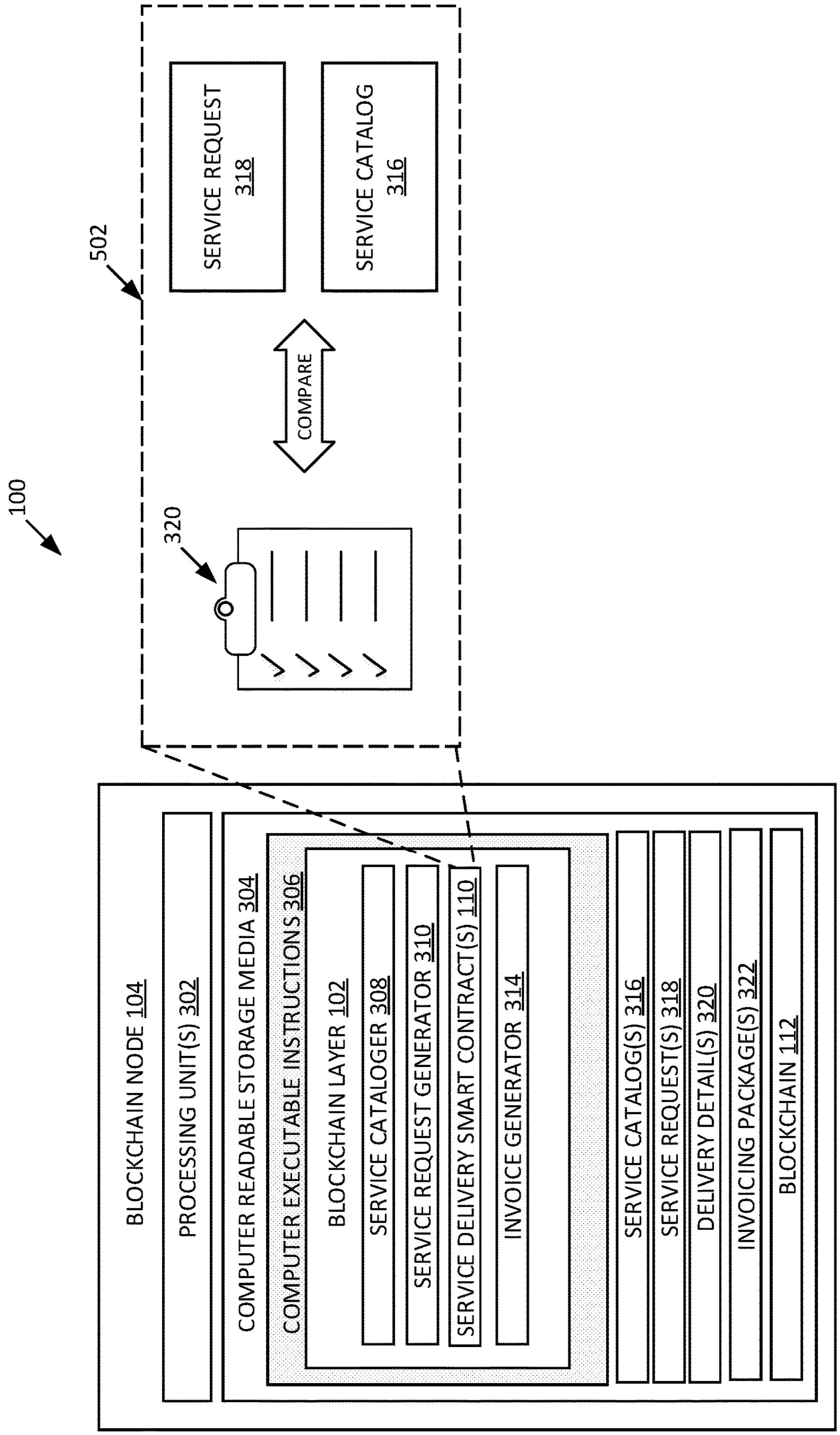
FIG. 5 is a diagram of the non-limiting example system comprising one or more blockchain components can compare service delivery details with the features of one or more smart contracts in accordance with one or more embodiments described herein.

In one or more embodiments, the one or more service delivery smart contracts 110 can verify that delivery of the requested services was completed in compliance with the DoS parameters defined in the service catalog 316 and/or included in the one or more generated services requests 318. FIG. 5 illustrates a diagram of the example non-limiting service delivery smart contracts 110 executing one or more matching algorithms 502 in accordance with one or more embodiments described herein.

While delivering the requested service to the enterprise entity, one or more enterprise agents can be present to review and/or supervise delivery of the work. For example, where the requested services are delivered to one or more locations associated with the enterprise, field staff can be on site to supervise the delivery. In various embodiments, the enterprise agents can characterize delivery of the vendor services by entering one or more delivery details 320 into the system 100 (e.g., via the enterprise user interface 106). For example, the delivery details 320 can include, but are not limited to: the quality of service delivery, the duration of service delivery, the time of service delivery, the location of service delivery, the number of vendor agents utilized during service delivery, the quantity of and/or properties (e.g., physical and/or chemical properties) of any products delivered, a combination thereof, and/or the like. Additionally, the delivery details 320 can include one or more supporting documents associated with the service delivery, such as: required regulatory documents (e.g., government permits), lab reports, a combination thereof, and/or the like.

In one or more embodiments, delivery of the requested services can also be monitored via one or more sensors operably coupled to, and/or integrated with, the enterprise systems 118. For example, the sensors can include pressure sensors, scales, cameras, temperature sensors, and/or the like. For instance, the one or more sensors can generate sensor data such as, but not limited to: the weight of delivered products, timestamped images of when products and/or services are delivered, and/or the temperature of delivered products. In various embodiments, the sensor data can be supplied to the one or more blockchain nodes 104 (e.g., via one or more APIs 116) as delivery details 320.

Further, in various embodiments delivery details 320 can be provided by the one or more vendor agents (e.g., via the one or more vendor user interfaces 108) upon delivery of each service line item included in the service request 318. In some instances, one or more third parties may be utilized to inspect delivery of the requested services by the one or more service providers and submit (e.g., via one or more enterprise user interfaces 106 and/or vendor user interfaces 108) inspection data and/or inspection determinations as delivery details 320. For example, one or more inspection reports can be entered into the system 100 as supporting documents associated with the delivery of one or more service line items. In another example, inspection data can characterize the number, quality, and/or characteristics of one or more delivered services. In various embodiments, the enterprise associates, sensors, and/or third parties can submit delivery details to the blockchain layer 102.

In one or more embodiments, the delivery details 320 can be stored in the computer readable storage media 304 of a local blockchain node 104 and/or on the blockchain 112. Further, the one or more service delivery smart contracts 110 can compare the delivery details 320 with DoS parameters defined in the one or more service requests 318 and/or service catalog 316. For example, delivery service smart contracts 110 can identify a service line item included in the service request 318 and reference the service catalog 316 to identify one or more DoS parameters associated with the identified service line item. Next, the service delivery smart contracts 110 can compare the identified DoS parameters to the delivery details. For instance, the service delivery smart contracts 110 can attempt to match one or more defined DoS parameters with one or more recorded delivery details 320. As a result of the matching algorithm 502, the service delivery smart contracts 110 can determine that the delivery of the requested service has been accepted, partially accepted, or not accepted. The matching algorithm 502 can be automatically triggered upon the blockchain layer 102 receiving delivery details 320.

The service delivery smart contracts 110 can determine that delivery of a service is accepted based on a full match between the DoS defined in the service request 318 and recorded delivery details 320. For instance, the service delivery smart contracts 110 can determine that the service delivery is accepted based on each DoS parameter being matched to an associate delivery detail 320. Additionally, the service delivery smart contracts 110 can determine that the service delivery is accepted based on matched delivery details 320 having data values in compliance with one or more values and/or thresholds defined by the associated DoS parameter. For example, the DoS parameters can define a service completion date and the service delivery smart contracts 110 can determine that service delivery is accepted where the delivery details 320 include a delivery data that is earlier than the service completion date. In another example, the DoS parameters can define a quality control inspection of delivered services and the service delivery smart contracts 110 can determine that service delivery is accepted where the delivery details 320 include an inspection report documenting that quality control standards were met.

In another example, the service delivery smart contracts 110 can determine that delivery of the service is partially accepted based on a subset of the DoS parameters being matched to a corresponding delivery detail 320. For instance, the service delivery smart contracts 110 can determine that the service delivery is partially accepted based on one or more DoS parameters being unmatched to a corresponding delivery detail 320. Additionally, the service delivery smart contracts 110 can determine that the service delivery is partially accepted based on one or more matched delivery details 320 having data values that are non-compliant with one or more values and/or thresholds defined by the associated DoS parameter. For example, the DoS parameter can define a quantity of goods to be provided by the service and the service delivery smart contracts 110 can determine that the service delivery is partially accepted where the delivery details 320 define that a small quantity of goods were delivered. Further, the service delivery smart contracts 110 can label one or more service line items defined in the service request 318 that need further verification due to the lack of corresponding delivery details 320.

In a further example, the service delivery smart contracts 110 can determine that delivery of the service is not accepted based on a lack of any matches between the DoS defined in the service request 318 and the delivery details 320. Additionally, the service delivery smart contracts 110 can determine that the service delivery is not accepted based on each matched delivery details 320 having a data value that is non-compliant with one or more values and/or thresholds defined by an associated DoS parameter. Further, the service delivery smart contracts 110 can generate one or more error notifications to inform the enterprise systems 118 and/or the enterprise user interface 106 that the delivery of the requested services is incomplete and/or non-compliant.

In one or more embodiments, the invoice generator 314 can generate one or more invoicing packages 322 based on the determinations of the service delivery smart contracts 110. For example, the invoice generator 314 can generate invoicing packages 322 that include a set of service line items that have been marked as "delivery accepted" by the service delivery smart contracts 110. The invoicing packages 322 can include the service line item details (e.g., identification numbers and/or descriptions) along with delivery details 320, associated purchase orders 404, and/or any supporting documents associated with the fulfilled service request 318.

In various embodiments, the invoicing packages 322 can include, and/or be associated with, one or more service entry sheets ("SES"). The SES can be used to record services as they were performed by the vendors. Thereby, payments for services characterized by the invoicing packages 322 can be traced to a SES, which in turn can be traced to the purchase order 404 referenced by the fulfilled service request 318. Additionally, the SES can define an approval authority of the invoiced amount based on one or more enterprise approval authority schedules (e.g., provided by the one or more enterprise systems 118 and/or enterprise user interfaces 106).

In some embodiments, the invoice generator 314 can categorize invoicing packages 322 as progress invoicing packages 322 or milestone invoicing packages 322. For example, progress invoicing packages 322 can be generated to provide periodic payments (e.g., monthly payments) to vendors where the delivery of contracted services exceeds a predefined length of time, which can be defined by the one or more contracts 324 and/or captured by the one or more service catalogs 316. For instance, the invoice generator 314 can generate progress invoicing packages 322 periodically in accordance with a predefined schedule, where the progress invoicing packages 322 can characterize service requests 318 fulfilled or partially fulfilled (e.g., service requests 318 marked as delivery accepted or partially accepted) by the time of invoicing. In another example, milestone invoicing packages 322 can be generated to provide payments to vendors based on the fulfillment of one or more stages of the contracted service. For instance, the invoice generator 314 can generate milestone invoicing packages 322 in response to the completion of a specified work phase or upon accepted delivery of the full scope of a service request 318.

The invoice generator 314 can generate the invoicing packages 322 in accordance with one or more invoice layout templates that can define, for example: the language used in the invoice, the currency used in the invoice, a service provider logo and/or other identification, one or more statuary requirements (e.g., taxation registration numbers and/or invoicing parties), net payable amount represented in words and figures, a content summary (e.g., characterizing the type and/or amount of labor employed), a combination thereof, and/or the like. In various embodiments, the invoice generator 314 can share the one or more invoicing packages 322 with the enterprise systems 118 to enable one or more payment processes. For example, one or more ERP programs executed by the enterprise systems 118 can maintain invoice details included in the invoicing packages 322, such as: invoice date, reference number, amount, and/or currency. Accordingly, the enterprise systems 118 can generate payment documents based on the invoicing packages 322 and post payments to the respective vendors.

Figure 6:
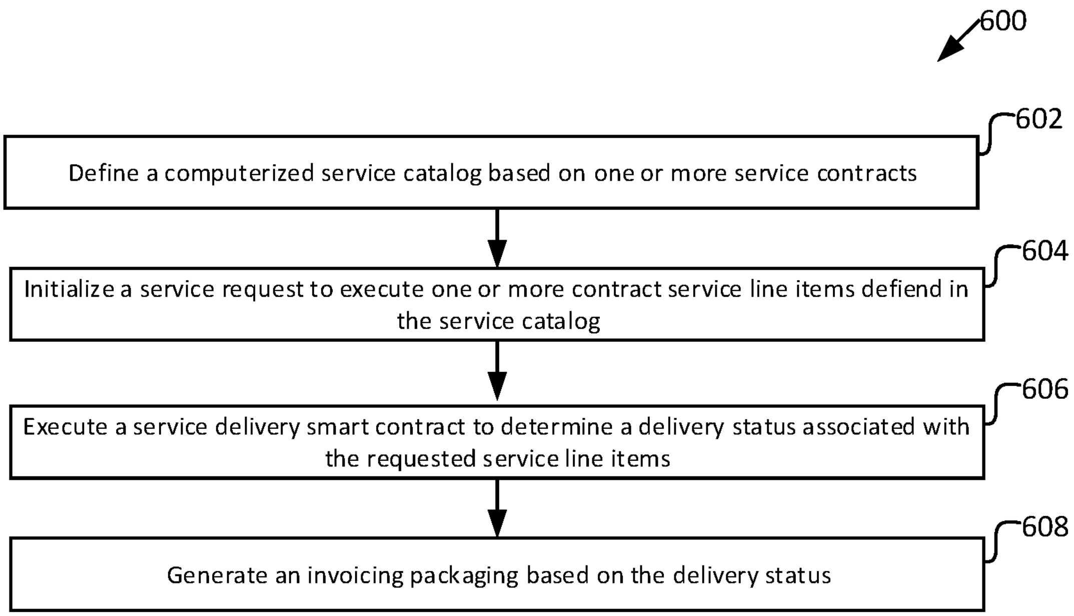
FIG. 6 is a flow diagram of a non-limiting example computer-implemented method that can be implemented with utilize blockchain technology to verify and manage service invoices in accordance with one or more embodiments described herein.

In view of the foregoing structural and functional features described above, example methods will be better appreciated with reference to FIG. 6. While, for purposes of simplicity of explanation, the example methods of FIG. 6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 6 illustrates an example non-limiting computer-implemented method 600 that can be implemented by the system 100 in accordance with one or more embodiments described herein. For example, method 600 can be implemented to utilize a blockchain 112 and delivery service smart contracts 110 to certify the delivery of services contracted between an enterprise and one or more vendors.

At 602, the method 600 can comprise defining (e.g., via service cataloger 308), by the system 100 operatively coupled to one or more processing units 302, one or more computerized service catalogs 316 based on one or more service contracts 324. In accordance with various embodiments described herein, the service contracts 324 can define terms and conditions agreed upon between the enterprise and vendors. Further, the terms and conditions can be digitally recorded by employing one or more standardized analysis templates 323 presented to, and/or interacted with, one or more users (e.g., enterprise agents) via a user interface (e.g., enterprise user interface 106). For example, the service contracts 324 can define contract service line items, payment details, DoS parameters, and/or the like. In one or more embodiments, the service catalogs 316 can be recorded in one or more blockchains 112.

At 604, the method 600 can comprise initializing one or more service requests 318 (e.g., via service request generator 310), by the system 100, to execute one or more contract service line items defined in the service catalog 316. For example, the service requests 318 can specify one or more service line items to be delivered and a budget allocation. In accordance with various embodiments described herein, the service request generator 310 can verify that the service line items specified in the service request 318 are services included in the service catalog 316. Additionally, the service request generator 310 can validate the budget allocation included in the one or more service requests 318 with a budget allocation defined in one or more associated purchase orders 404. In one or more embodiments, the service requests 318 can be recorded in one or more blockchains 112.

At 606, the method 600 can comprise executing one or more service delivery smart contracts 110, by the system 100, to determine a delivery status associated with the requested service line items. In accordance with one or more embodiments described herein, the service delivery smart contracts 110 can execute one or more matching algorithms 502 to compare delivery details 320 with one or more DoS parameters (e.g., defined in the service catalogs 316) associated with the service line items (e.g., included in the service requests 318). For example, the service delivery smart contracts 110 can determine at 606 whether delivery of a requested service line item has been accepted, partially accepted, and/or not accepted.

At 608, the method 600 can comprise generating (e.g., via invoice generator 314), by the system 100, one or more invoicing packages based on the delivery status determined at 606. For example, the invoicing packages can include service line item details (e.g., identification numbers and/or descriptions) along with delivery details 320, associated purchase orders 404, and/or any supporting documents associated with the fulfilled service request 318.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 7. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 7:
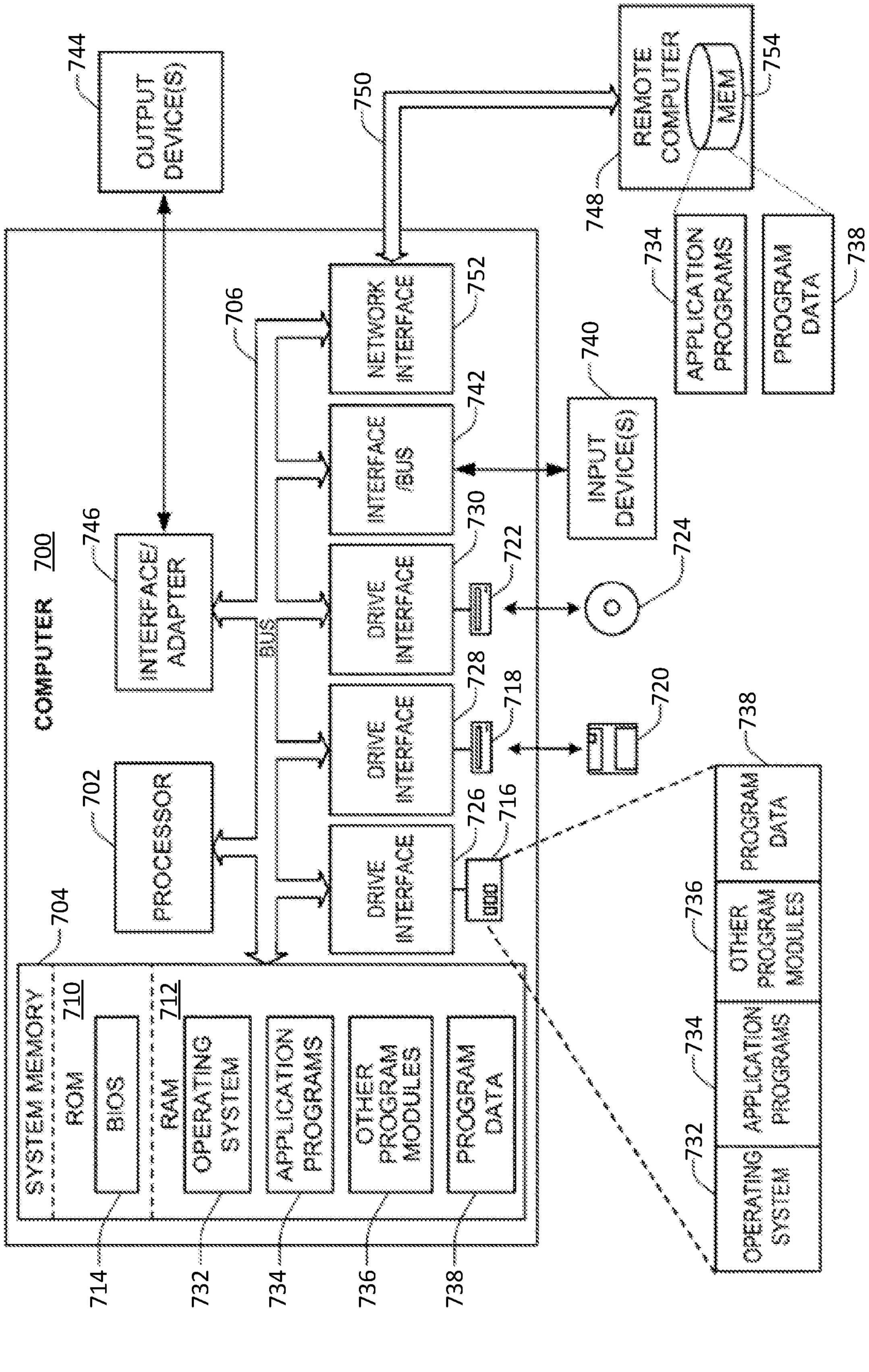
FIG. 7 illustrates a block diagram of non-limiting example computer environment that can be implemented within one or more systems described herein.

In this regard, FIG. 7 illustrates one example of a computer system 700 that can be employed to execute one or more embodiments of the present disclosure. Computer system 700 can be implemented on one or more general purpose networked computer systems, embedded computer systems, routers, switches, server devices, client devices, various intermediate devices/nodes or standalone computer systems. Additionally, computer system 700 can be implemented on various mobile clients such as, for example, a personal digital assistant (PDA), laptop computer, pager, and the like, provided it includes sufficient processing capabilities.

Computer system 700 includes processing unit 702, system memory 704, and system bus 706 that couples various system components, including the system memory 704, to processing unit 702. Dual microprocessors and other multi-processor architectures also can be used as processing unit 702. System bus 706 may be any of several types of bus structure including a memory bus or memory controller, a peripheral bus, and a local bus using any of a variety of bus architectures. System memory 704 includes read only memory (ROM) 710 and random access memory (RAM) 712. A basic input/output system (BIOS) 714 can reside in ROM 710 containing the basic routines that help to transfer information among elements within computer system 700.

Computer system 700 can include a hard disk drive 716, magnetic disk drive 718, e.g., to read from or write to removable disk 720, and an optical disk drive 722, e.g., for reading CD-ROM disk 724 or to read from or write to other optical media. Hard disk drive 716, magnetic disk drive 718, and optical disk drive 722 are connected to system bus 706 by a hard disk drive interface 726, a magnetic disk drive interface 728, and an optical drive interface 730, respectively. The drives and associated computer-readable media provide nonvolatile storage of data, data structures, and computer-executable instructions for computer system 700. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 710, including operating system 732, one or more application programs 734, other program modules 736, and program data 738. In some examples, the application programs 734 can include service cataloger 308, service request generator 310, service delivery smart contracts 110, invoice generator 314, and the program data 738 can include one or more blocks to a blockchain 112 that can record service catalogs 316, service requests 318, delivery details 320, and/or invoicing packages 322. The application programs 734 and program data 738 can include functions and methods programmed to validate the delivery status and/or conditions of requested services defined by contractual terms and conditions, such as shown and described herein.

A user may enter commands and information into computer system 700 through one or more input devices 740, such as a pointing device (e.g., a mouse, touch screen), keyboard, microphone, joystick, game pad, scanner, and the like. For instance, the user can employ input device 740 to edit or modify the service catalogs 316, generate service requests 318, and/or supply delivery details 320. These and other input devices 740 are often connected to processing unit 702 through a corresponding port interface 742 that is coupled to the system bus, but may be connected by other interfaces, such as a parallel port, serial port, or universal serial bus (USB). One or more output devices 744 (e.g., display, a monitor, printer, projector, or other type of displaying device) is also connected to system bus 706 via interface 746, such as a video adapter.

Computer system 700 may operate in a networked environment using logical connections to one or more remote computers, such as remote computer 748. Remote computer 748 may be a workstation, computer system, router, peer device, or other common network node, and typically includes many or all the elements described relative to computer system 700. The logical connections, schematically indicated at 750, can include a local area network (LAN) and a wide area network (WAN). When used in a LAN networking environment, computer system 700 can be connected to the local network through a network interface or adapter 752. When used in a WAN networking environment, computer system 700 can include a modem, or can be connected to a communications server on the LAN. The modem, which may be internal or external, can be connected to system bus 706 via an appropriate port interface. In a networked environment, application programs 734 or program data 738 depicted relative to computer system 700, or portions thereof, may be stored in a remote memory storage device 754.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:

memory to store computer executable instructions; and one or more processors, operatively coupled to the memory, that execute the computer executable instructions to implement:

a service cataloger configured to define, via the at least one blockchain layer distributed amongst a plurality of blockchain nodes implemented over a network, a service catalog based on a service contract between a plurality of entities, wherein the service catalog includes a service line item and an associated delivery of service parameter defined in the service contract, wherein the service catalog is recorded on a blockchain, and wherein, to define the service catalog, the service cataloger is further configured to:

provide, via the at least one blockchain layer distributed amongst a plurality of blockchain nodes, a standardized analysis template, thereby querying population of the standardized analysis template with data comprising the service line item and the associated delivery of service parameter; and consolidate, via the at least one blockchain layer distributed amongst a plurality of blockchain nodes, the data from the populated standardized analysis template; and a service delivery smart contract configured to determine, in real-time and via the at least one blockchain layer distributed amongst a plurality of blockchain nodes, a delivery status of the service line item by a matching algorithm comparing compliance of a value defined by a delivery detail recorded on the blockchain with a corresponding value defined by the associated delivery of service parameter, or by a lack of the value defined by the delivery detail recorded on the blockchain; and a service request generator configured to generate, via the at least one blockchain layer distributed amongst a plurality of blockchain nodes, a service request for a vendor from the plurality of entities to deliver the service line item to an enterprise from the plurality of entities, wherein, to generate a service request, the service request generator is further configured to select from the service catalog, or verify the presence therein of, the service line item to be delivered, and wherein the service request is recorded on the blockchain.

2. The system of claim 1, wherein the delivery detail is associated with an attempted fulfillment of the service request, and wherein the lack of the delivery detail is associated with non-fulfillment of the service request.

3. The system of claim 1, wherein the service delivery smart contract determines the delivery status as partially accepted based on the delivery detail being recorded on the blockchain but the value defined by the delivery detail being non-compliant with the corresponding value defined by the associated delivery of service parameter.

4. The system of claim 1, wherein the one or more processors further comprise:

an invoice generator configured to generate, via the at least one blockchain layer distributed amongst a plurality of blockchain nodes, an invoicing package based on the delivery status, wherein the invoicing package includes the service request, the delivery status, the delivery detail, a purchase order, or a combination thereof.

5. The system of claim 4, wherein the invoicing package is generated periodically based on a recent determination of the delivery status.

* * * * *